March 19, 1963  J. E. FIELDEN ET AL  3,082,362
MEASURING AND CONTROL SERVOSYSTEM
Filed Nov. 12, 1959  3 Sheets-Sheet 1

Inventors
J. E. Fielden
L. Tremlett
By Glascock Downing Seebold
Attys.

Inventors
J. E. Fielden
L. Tremlett
By Gascoit Downing Diebold
Att'ys

United States Patent Office 3,082,362
Patented Mar. 19, 1963

3,082,362
MEASURING AND CONTROL SERVO-SYSTEM
John E. Fielden, Cheshire, and Laurence Tremlett, Totteridge, London, England, assignors to Fielden Electronics Limited, Manchester, England, a company of Great Britain
Filed Nov. 12, 1959, Ser. No. 852,241
Claims priority, application Great Britain Nov. 17, 1958
20 Claims. (Cl. 318—28)

This invention relates to servo-motor means for positioning a member in accordance with a variable quantity.

A known servo-motor means for this purpose comprises an amplifier and a balanceable bridge circuit the balance condition of which is dependent upon the variable quantity and the position of the movable member, the output and input circuits of the bridge respectively forming input and output circuits of the amplifier such that the combination of amplifier and bridge oscillates at one frequency when the bridge is on one side of balance and at another frequency when the bridge is on the other side of balance, relay means connected to the amplifier and operative to actuate sets of contacts selectively in dependence upon the frequency of oscillation and an electric motor connected to the relay means and operable to move the movable member in one direction or the other according to which set of contacts is actuated, the direction of movement being such as to restore the bridge to balance after a change in the variable quantity.

In this known arrangement the different sets of contacts are operated only when the bridge departs from balance sufficiently to cause the energising current of the relay means to attain the minimum value necessary to cause the relay means to operate. The arrangement is therefore insensitive to changes in the variable which do not unbalance the bridge sufficiently to cause the relay means to operate. Furthermore, as the motor is switched instantaneously from an unenergised to a fully energised condition and vice versa the known arrangement must have a tendency to hunt.

So far as the applicants are aware, in all known servo-motor means employing an electric motor for accurately positioning a movable member in accordance with a variable quantity the motor is operatively connected to the movable member via a gear train. The two main reasons for adopting this form of drive are, firstly, that a large mechanical advantage may be obtained and, secondly, lost motion between the motor and the movable member may be eliminated. A gear train is, however, expensive to manufacture because the gears require accurate machining and the shafts upon which the gears are supported require to be accurately positioned relatively to each other.

The object of the invention is to provide an improved servo-motor means for positioning a movable member in accordance with a variable quantity.

According to the invention, a servo-motor means for positioning a movable member in accordance with a variable quantity comprises an amplifier and a balanceable bridge circuit the balance condition of which is dependent upon the variable quantity and the position of the movable member, the output and input circuits of the bridge respectively forming input and output circuits of the amplifier such that oscillation at a frequency determined by a tuned circuit in the amplifier occurs when the bridge is on one side of balance only, a rectifying means having its input circuit coupled to said tuned circuit and providing at its output terminals a unidirectional current dependent upon the amplitude of oscillation and a direct current motor operable to move said movable member and so energised in dependence upon said unidirectional current that the current in the armature of said motor changes gradually from a maximum in one direction to a maximum in the other direction as the amplitude of oscillation changes gradually from zero to maximum and vice versa.

The present invention provides novel arrangements in which oscillations of a predetermined amplitude are generated under equilibrium conditions and which discriminate between departure from equilibrium in one direction and departure in the other direction by generating oscillations of an amplitude greater than or less than the predetermined amplitude.

Several embodiments of the invention will now be described, by way of example, with reference to the accompanying drawings, of which:

In the figures corresponding circuit elements are indicated by the same reference numeral.

Figure 1:
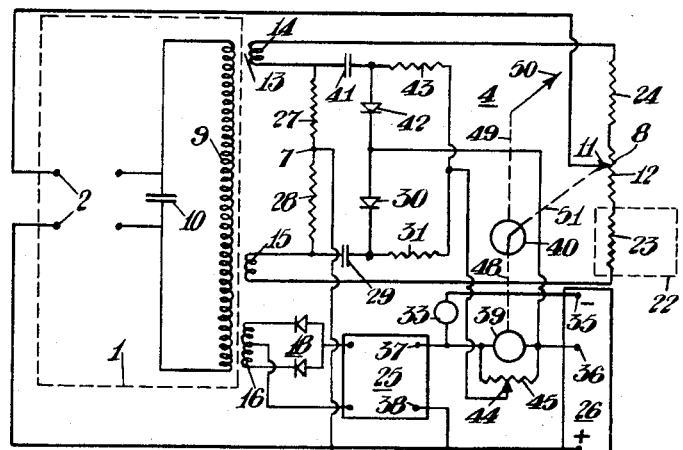
FIGURE 1 is a partly schematic circuit diagram of one embodiment for positioning a movable element in accordance with temperature.
Figure 2:
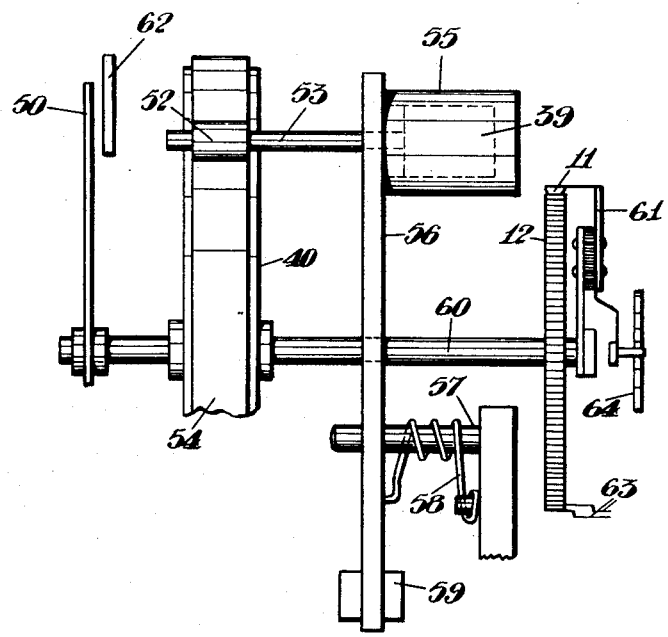
FIGURE 2 shows certain mechanical details of the embodiment of FIGURE 1.

As shown in FIGURES 1 and 2, an embodiment of the invention comprises an amplifier, indicated by the rectangle 1, and a balanceable bridge circuit 4, the amplifier having input terminals 2 and an output circuit including a parallel tuned circuit formed by an inductor 9 and a capacitor 10 and the bridge having output terminals 7 and 8 to which the input terminals 2 are connected. The output terminal 8 is constituted by the slider 11 of a resistive potential divider 12. The inductor 9 forms the primary winding of a transformer 13 having secondary windings 14, 15, and 16. The winding 14 is connected in one of the parallel paths through the bridge between terminals 7 and 8 and the winding 15 is connected in the other parallel path through the bridge between these two terminals. For convenience, this circuit is first described assuming that resistors 27, 28, capacitors 29, 41, diodes 30, 42, resistors 31, 43, potential divider 45 and the associated conductors are omitted and that the output terminal 7 is directly connected to the adjacent ends of windings 14 and 15.

The windings 14 and 15 supply energy during oscillation to the bridge 4 from the amplifier 1, the windings being so connected that feedback to the input terminals 2 of the amplifier 1 via winding 14 is negative and feedback to those input terminals via winding 15 is positive.

If an exciting potential appears at the input terminals of the amplifier 1 and the positive feedback to these input terminals exceeds the negative feedback to them by an amount such that the signal fed back is equal in amplitude to, and in phase with, the exciting potential the arrangement will just commence to oscillate at the resonant frequency of the tuned circuit 9, 10.

The secondary winding 16 supplies energy, when oscillation occurs, to a full-wave rectifier 18 the output of which is connected to the input of an amplifier 25 providing at its output terminals 37 and 38 a unidirectional current which increases with the amplitude of oscillation. The output terminals 37 and 38 are connected in series with a metal filament lamp 33 between the terminals 34 and 35 to which the positive and negative terminals respectively of a source of unidirectional power 26 may be connected. The armature 39 of a permanent magnet direct current motor is connected between terminal 37 of the amplifier 25 and a third terminal 36 connected to a tapping on the power source 26, the potential of the terminal 36 being mid-way between the potentials of terminals 34 and 35.

A temperature sensitive resistor 23 having a resistance which increases with temperature and positioned in the heat zone 22 for the purpose of measuring its temperature is connected in the bridge circuit between winding 15 and terminal 8. A range resistor 24 is connected in the bridge circuit between winding 14 and terminal 8.

The movable member which is to be positioned in accordance with the temperature of the heat zone 22 is a disc 40 (FIGURE 2) mounted upon a shaft 60, the angular position of the disc 40 being indicated by a pointer 50, also mounted upon the shaft 60 and moving over a scale 62.

The disc 40 is driven by the motor armature 39 through a friction drive formed by engagement of a sleeve 52, provided on the spindle 53 of the armature 39, with a ring 54 provided on the periphery of the disc 40. Both the sleeve 52 and the ring 54 are formed of material having a high coefficient of friction. The motor 55 is mounted, with the spindle 53 of its armature 39 parallel to the shaft 60, upon an arm 56 mounted upon a pivot 57, the arm being biassed by means of a spring 58 in order to maintain a pressure between the spindle 53 and the periphery of the disc 40. Preferably the combination of the motor 55 and the pivoted arm 56 is mechanically balanced by means of a counterweight 59 in order to prevent this pressure being disturbed by mechanical shock or vibration.

Also mounted upon the shaft 60 is a contact arm 61, insulated from the shaft 60 and carrying at its end the slider 11. The potential divider 12 is of an arcuate form having the centre of the arc on the axis of the shaft 60. Electrical connection to the contact arm 61 is made via a hair spring 64 and to the potential divider 12 via conductors 63.

The friction drive between the disc 40 and the armature 39, the mechanical link between the disc 40 and pointer 50 via the shaft 60 and the mechanical link between the disc 40 and slider 11 via the shaft 60 are indicated in FIGURE 1 by the broken lines 48, 49, and 51 respectively.

The arrangement so far described operates as follows:

Assuming that the temperature of the heat zone 22 is such that the bridge is unbalanced in the direction to cause oscillation, that the degree of unbalance is such that the amplitude of oscillation has a predetermined value and that the output of the amplifier 25 is then such that the potential difference across the lamp 33 is equal to the potential difference between terminals 35 and 36, the armature 39 is then stationary. The gain of the amplifier is made sufficiently high to ensure that the difference between the heat zone temperature required to produce balance and that required to maintain the armature stationary is insignificant.

If now the temperature of the heat zone increases the resistance of resistor 23 increases and the positive feedback to the terminal 2 via winding 15 decreases. The amplitude of oscillation falls, therefore, causing the output current of amplifier 25 to fall also. With this fall in output current the current through the lamp 33 decreases and the resistance of the lamp decreases. The potential of terminal 37 therefore approaches that of terminal 35 and a current flows through the armature 39 in a direction from terminal 36 to terminal 37. The consequent rotation of the armature is arranged to be in a direction to restore the bridge to its original condition of unbalance.

If, on the other hand the temperature of the heat zone decreases the direction of the resulting changes is reversed with the result that the potential of terminal 37 approaches that of terminal 34. The direction of current through the armature 39 and, consequently, the direction of rotation of the armature is reversed. This new direction of rotation is, however, still in a direction to restore the bridge to its original condition of unbalance.

The arrangement thus operates to position the disc 40 in accordance with the temperature of the heat zone 22 and by suitably calibrating the scale 62 the pointer 50 can be arranged to indicate the temperature directly.

The lamp 33 may be replaced by a resistor having a resistance which increases with the current flowing through it. Alternatively, the lamp may be replaced by a resistor having a resistance which is substantially independent of the current flowing through it but the maximum torque developed by the motor will then be reduced due to the larger potential drop occurring across the resistor 33.

The potential of terminal 36 is not limited to a value mid-way between the potentials of terminals 34 and 35. As, however, the maximum torque developed when the armature is driven in one direction is dependent upon the potential difference between terminals 35 and 36 and, as it is desirable that the maximum torque shall be the same whatever the direction of rotation, the potential of terminal 36 is preferably mid-way between the potentials of terminals 34 and 35. The circuit components are so chosen that the armature current is a maximum in one direction when the amplitude of oscillation is zero and a maximum in the reverse direction when the amplitude of oscillation is a maximum.

By a suitable modification it can be arranged that the disc 40 is positioned in accordance with any variable which can be caused to affect the balance condition of the bridge.

The arrangement described above has the feature that the armature current changes gradually from a maximum in one direction to a maximum in the reverse direction as the amplitude of oscillation changes from zero to maximum and vice versa. Consequently, armature current commences to flow immediately the bridge departs from a predetermined condition of unbalance at which the amplitude of oscillation has the predetermined value. Furthermore, the magnitude of the armature current increases continuously the further the bridge departs from that predetermined condition of unbalance. Consequently, a restoring torque is developed by the motor immediately the arrangement departs from equilibrium, this torque increasing as the arrangement departs further from equilibrium and decreasing as it approaches equilibrium. The arrangement therefore possesses an inherent tendency not to hunt.

By adopting a friction drive and by supporting the motor on a pivoted arm the present invention, while providing a drive having a large mechanical advantage, eliminates the need for accurate machining and, consequently, considerably reduces cost. The choice of a friction drive in place of a gear drive does not result in any reduction in the accuracy with which the movable member is positioned because the disc 40 moves with the slider 11 and the slider 11 must take up a position at which the bridge is restored to the predetermined condition of the unbalance. The only effect of slip, provided it is not 100%, is to slightly prolong the period required to readjust the bridge after a change in the variable quantity.

In order to improve stability a stabilising circuit arrangement is provided. This consists of a resistor 27 connected between winding 14 and terminal 7, a resistor 28 connected between winding 15 and terminal 7 and, connected in parallel with the resistors 27 and 28, a series circuit consisting of a condenser 29, two semi-conductor diodes 30 and 42, so poled as to conduct in a direction towards condenser 29 and a condenser 41. If, as is preferable, the range resistor 24 has a resistance substantially equal to the resistance of resistor 23 at the mid point of the desired temperature range, the resistors 27 and 28 have low and equal resistances, the condensers 29 and 41 have equal reactances which are small at the frequency of oscillation compared with the resistances of the diodes 30 and 42 and the diodes 30 and 42 have equal resistances when the potentials applied to them are equal.

The common connection of the diodes 30 and 42 is connected to terminal 36, the common connection of the condenser 29 and diode 30 and the common connection of the condenser 41 and diode 42 are connected through resistors 31 and 43 respectively, to the slider 44 of a potential divider 45 connected in parallel with the armature 39. As the direct current source has a low internal impedance terminals 34 and 36 are at the same potential so far as oscillatory current is concerned.

Consequently, the common connection between resistors 27 and 28 and the common connection between diodes 42 and 30 are at the same oscillatory potential and the diodes 42 and 30 are effectively in parallel with resistors 27 and 28 respectively so far as oscillatory current is concerned.

The complete circuit shown in FIGURE 1 operates as follows:

Assuming that the armature 39 is stationary and that no current flows through the potential divider 45 the unidirectional potential derived from this potential divider and applied to the diodes 30 and 42 is zero also. Consequently, the diodes 30 and 42 have resistances corresponding to their unbiased condition and, as the diodes are similar, their resistances are equal and are without effect upon the balance condition of the bridge.

If the temperature of the heat zone 22 now increases the amplitude of oscillation falls and the potential of terminal 37 approaches that of terminal 35 as described above. The potential of slider 44 consequently falls below that of terminal 36 causing a forward bias to be applied to diode 30 and a negative bias to be applied to diode 42. The resistance of diode 30 therefore falls and the resistance of diode 42 remains high. The total resistance in series with winding 15 between terminals 7 and 8 is therefore subject to two opposing changes: an increase in the resistance of resistor 23 tending to increase the armature current and a decrease in the resistance of the diode 30 tending to reduce the armature current. The latter change has the effect of reducing the speed at which the motor readjusts the arrangement to equilibrium after a change in temperature and it consequently improves stability.

If, on the other hand, the temperature of the heat zone decreases the amplitude of oscillation increases, the potential of slider 44 rises above that of terminal 36, a negative bias is applied to diode 30 and a forward bias is applied to diode 42. The resistance of diode 30 therefore remains high and the resistance of diode 42 falls.

Due to the fall in the resistance of resistor 23 the total resistance in series with winding 15 between terminals 7 and 8 decreases causing an increase in the armature current. The decrease in the resistance of diode 42, however, reduces the total resistance in series with the winding 14 between terminals 7 and 8 and causes a decrease in the armature current. Again, therefore, the speed at which the motor readjusts the arrangement to equilibrium after a change in temperature is reduced. The magnitude of the stabilising effect may be adjusted to a convenient value by adjustment of the position of the slider 44. If no such adjustment is required the potential divider 45 may be omitted and the common connection of resistors 31 and 43 may be connected to terminal 37.

Figure 3:
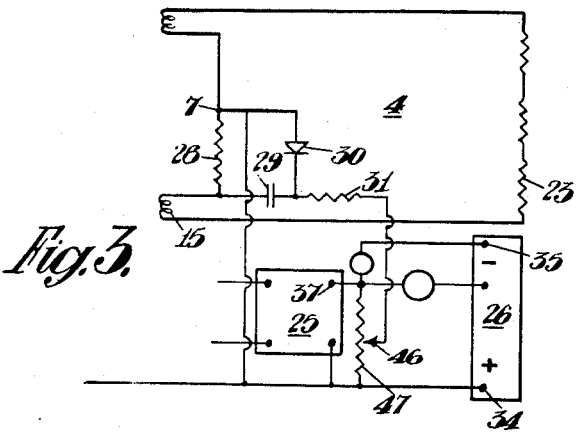
FIGURES 3 to 6 show modifications of part of the circuit of FIGURE 1.

In the modification shown in FIGURE 3 the bridge 4 includes a resistor 28 connected between output terminals 7 and winding 15, the resistor 28 having connected in parallel with it a series circuit consisting of a condenser 29 and a semi-conductor diode 30. The common connection of the condenser 29 and the diode 30 is connected via a resistor 31 to the slider 46 of a potential divider 47 connected between the positive terminal 34 of a direct current source 26 and terminal 37 of amplifier 25 and the diode 30 is so poled as to conduct in the direction towards this common connection. The reactance of the condenser 29 is small, at the frequency of oscillation, compared with the resistance of the diode 30.

The potential of the terminal 37 varies with the amplitude of oscillation from substantially that of the positive terminal 34 to substantially that of the negative terminal 35 of the direct current source 26. The position of the slider 46 is adjusted so that the forward bias applied to the diode 30 when the arrangement is in equilibrium is such that the resistance of the diode 30 is intermediate its extreme values.

Assuming that the resistance of the temperature sensitive resistor 23 increases with temperature and that the temperature of the heat zone 22 rises, the amplitude of oscillation falls, the potential of terminal 37 approaches that of terminal 35, the forward bias applied to diode 30 increases and the resistance of diode 30 decreases. The total resistance in series with winding 15 between terminals 7 and 8 is therefore subject to two opposing changes: an increase in the resistance of resistor 23 and a decrease in the resistance of diode 30.

Assuming that the temperature of the heat zone falls, the resistance of resistor 23 falls, the amplitude of oscillation increases, the potential of terminal 37 approaches that of terminal 34, the forward bias applied to diode 30 decreases and the resistance of diode 30 increases.

Consequently, this modified stabilising circuit is effective to change the resistance of diode 30, when the resistance of resistor 23 changes, in such a direction as to oppose the effect of the change in resistance of resistor 23 and thereby to slow down the speed of readjustment after a change in temperature.

Figure 4:
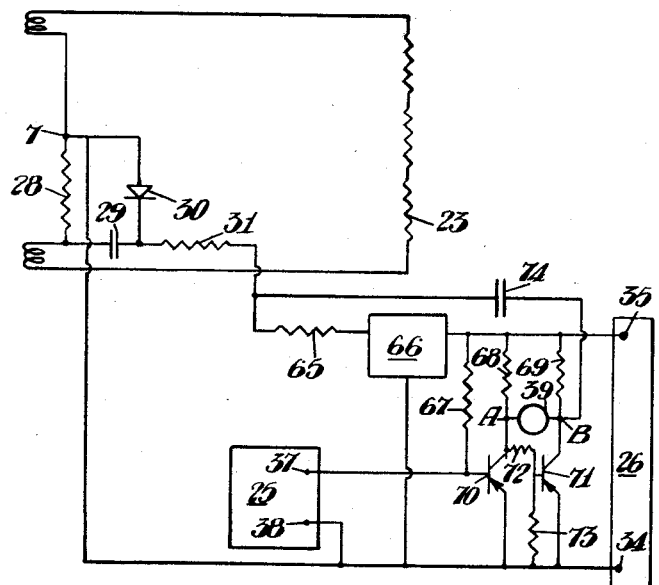

The maximum torque developed by the motor may be increased by connecting the armature 39 between the output circuits of two amplifier elements connected for phase inversion, the input circuit of one of the amplifier elements being connected to the output terminals 37 and 38. To this end the motor energising circuit may be modified as shown in FIGURE 4.

In this modification the output terminal 37 of the amplifier 25 is connected to the negative terminal 35 of a source of unidirectional power 26 via a resistor 67 and to the base electrode of a transistor 70. The output terminal 38 is, as in the arrangements described above, connected to the positive terminal 34 of the source 26. The collector electrode of transistor 70 is connected to terminal 35 via a resistor 68 and to the terminal 34 via resistors 72 and 73 connected in series. The common connection of resistors 72 and 73 is connected to the base electrode of a second transistor 71, the collector electrode of which is connected to terminal 35 via a resistor 69 and the emitter electrode of which is connected to terminal 34.

The motor armature 39 is connected between points A and B which are respectively connected to the collector electrode of transistors 70 and 71.

In operation, if it is assumed that the amplifier 25 is providing a minimum output current, the potential of the base electrode of transistor 70 approaches that of the negative terminal 35 of the source. The transistor 70 therefore conducts and a substantial current flows through resistor 68. The potential of point A therefore approaches that of the positive terminal 34 with the result that the potential of the base electrode of transistor 71 also approaches that of the positive terminal 34 and the current flowing in the collector circuit of transistor 71 falls to a low value. The potential of point B therefore approaches that of the negative terminal 35. A maximum current thus flows through the armature 39 in a direction from point A to point B. If, on the other hand, it is assumed that the amplifier 25 is providing maximum output current, the potential of the base electrode of transistor 70 approaches that of the positive terminal 34 and transistor 70 is cut-off. The potential of point A therefore approaches that of the negative terminal 35 with the result that the potential of the base electrode of transistor 71 also approaches that of the negative terminal 35 and the current flowing in the collector circuit of transistor 71 rises to a high value. The potential of point B therefore approaches that of positive terminal 34. A maximum current thus flows through the armature 39 in the direction from point B to point A.

Between these two conditions there is a third condition in which both transistors 70 and 71 conduct and the potential difference between points A and B is zero and in this condition the amplitude of oscillation has its predetermined value. As the maximum potential applied to the armature 39 approximates to the potential between terminals 34 and 35 the maximum torque is higher than is possible using the circuit of FIGURE 1 where, in the preferred arrangement, the maximum potential applied to the armature 39 approximates to half the potential applied between terminals 34 and 35.

The resistors 68 and 69 may be replaced by metal filament lamps in order to increase the maximum torque still further.

The transistors 70 and 71 may be replaced by thermionic valves, the phase inversion circuit being modified accordingly in an obvious manner.

As friction causes the armature to cease rotation before the voltage across it falls to zero a steady bias will normally be applied to the diodes 30 and 42 of FIGURE 1 or the diode 30 of FIGURE 3 when the armature is stationary. Consequently the position of the disc 40 and, therefore, the indication of the pointer 50 will be subject to some error. This error may be reduced by so modifying the stabilising circuits that no bias is applied to the diode or diodes when the armature is stationary.

Such a modified biassing circuit is shown in FIGURE 4. It comprises a resistor 28, condenser 29, diode 30 and resistor 31 connected to the bridge as described above with reference to FIGURE 3, the end of resistor 31 remote from the diode 30 being connected via a decoupling resistor 65 to a source of stabilised voltage 66, energised from terminals 34 and 35 and to point B via a condenser 74. The resistors 31 and 65 are of a sufficiently high resistance compared with that of diode 30 to ensure that the forward bias applied to diode 30 from the source 66 via resistors 31 and 65 is substantially constant and of such a value that the resistance of the diode 30 has a value intermediate its maximum and minimum.

This modified stabilising circuit operates as follows:

Assuming that the temperature of the heat zone 22 rises from a value at which the arrangement is in equilibrium, the amplitude of oscillation falls and the potential of point B approaches that of the negative terminal 35 as described above. Consequently, a transient forward bias is applied to the diode 30 in addition to the constant forward bias, the magnitude of the transient bias being proportional to the rate of change of potential of point B.

Due to this transient forward bias the resistance of diode 30 falls. The magnitude of the positive feedback from the bridge terminals 2 via winding 15 is therefore subject to two opposing changes, a decrease due to the increase of resistance of resistor 23 and an increase due to the fall in the resistance of diode 30.

Assuming that the temperature of the heat zone falls from a value at which the arrangement is in equilibrium the sense of the change in the resistance of diode 30 is reversed.

Consequently the stabilising circuit of FIGURE 4 is effective to change the resistance of the diode 30 in a direction to retard readjustment after a change in temperature and, as the change in the resistance of diode 30 is dependent upon the rate of change of the amplitude of oscillation whereas, in the circuits of FIGURES 1 and 3, it is dependent upon the change in that amplitude, the improvement in stability is greater than that attained by the circuits of FIGURES 1 and 3.

Instead of being connected to point B, the condenser 74 may be connected to point A but the polarity of diode 30 must then be reversed. Alternatively, instead of being connected to point B, the condenser 74 may be connected to terminal 37.

Figure 5:
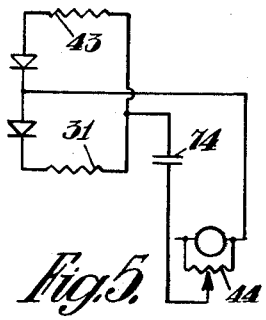
Figure 6:
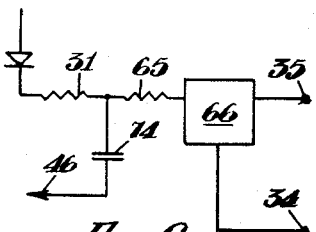

The circuits of FIGURES 1 and 3 may be modified as shown in FIGURES 5 and 6 respectively in order to prevent a bias being applied to the diode or diodes when the armature is stationary and in order to render the resistance change in the diode or diodes dependent upon the rate of change in amplitude of oscillation. As shown in FIGURE 5 a condenser 74 may be inserted in the connection between the slider 44 and the common connection of the resistors 31 and 43; and as shown in FIGURE 6, a condenser 74 may be inserted in the connection between the slider 46 and the resistor 31, the common connection of the resistor 31 and the condenser 74 being connected via a resistor 65 to a source of constant potential 66, energised from terminals 34 and 35, such that a constant forward bias is applied to diode 30.

The diodes 30 and 42 may be replaced by any suitable element the resistance of which varies suitably with the applied potential.

If the positions of the temperature sensitive resistor 23 and the range resistor 24 are interchanged the amplitude of oscillation increases as the temperature of the heat zone 22 rises and vice versa, and no alteration need, therefore, be made to the stabilising circuit.

It will be noted that the instruments described above are entirely without toothed gears.

What we claim is:

1. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation, a direct current motor operable to move said movable member, a source of current, and means connecting the motor to the source of current and to the output terminals of the rectifying means for energizing the motor in dependence upon said unidirectional current to vary the current in the armature of said motor gradually from a maximum in one direction to a maximum in the other direction as the amplitude of oscillation changes gradually from zero to maximum, said connecting means causing the armature to move said movable member in a direction to restore said amplitude to a predetermined value after a change in a variable quantity.

2. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein said output terminals are connected in series with a first resistor across a source of unidirectional power and said armature is connected between an intermediate tapping on said power source and the common connection between said first resistor and the adjacent one of said output terminals.

3. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein said output terminals are connected to the input circuit of one of a pair of amplifying elements connected for phase inversion and said armature is connected between the output circuits of said amplifier elements.

4. A servo-motor means according to claim 3 wherein said output terminals are connected in series with a second resistor across first and second power input terminals to which a source of unidirectional power may be applied and the output circuit of each amplifier element includes a load resistor having one end connected to said second power input terminal and said armature is connected between the other ends of said load resistors.

5. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein each of two arms of said bridge includes an element the resistance of which is dependent upon the potential applied to it, said element being so connected in the bridge and a potential dependent upon the armature potential being so applied to each said element that the balance condition of the bridge is altered due to alteration in the resistance of said elements in a direction to reduce said armature potential whatever the polarity of said armature potential.

6. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current, that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein one arm of said bridge includes an element the resistance of which is dependent upon a potential applied to it, said element being so connected in the bridge and a potential varying about a mean value in dependence upon the armature potential being so applied to said element that the balance condition of the bridge is altered due to alteration in the resistance of said elements in a direction to reduce said armature potential, whatever the polarity of said armature potential, said mean value being such that the resistance of said element is intermediate its maximum and minimum values when said armature is stationary.

7. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein each of two arms of said bridge includes an element the resistance of which is dependent upon the potential applied to it, said elements being so connected in the bridge and a potential dependent upon the rate of change of armature potential being so applied to each said element that the balance condition of the bridge is altered due to alteration in the resistance of said elements in a direction to reduce said armature potential whatever the polarity of said armature potential.

8. A servo-motor means for positioning a movable member in accordance with a variable quantity comprising an amplifier and a balanceable bridge circuit the balance condition of which is dependent upon the variable quantity and the position of the movable member, the output and input circuits of the bridge respectively forming input and output circuits of the amplifier such that oscillation occurs at a frequency determined by a tuned circuit in the amplifier when the bridge is on one side of balance only, a rectifier means having its input circuit coupled to said tuned circuit and providing at its output terminals a unidirectional current dependent upon the amplitude of oscillation and a direct current motor operable to move said movable member and so energized in dependence upon said unidirectional current that the current in the armature of said motor changes gradually from a maximum in one direction to a maximum in the other direction as the amplitude of oscillation changes gradually from zero to maximum, the armature driving in a direction to move said movable member to restore said amplitude to a predetermined value after a change in the variable quantity, wherein one arm of said bridge includes an element the resistance of which is dependent upon the potential applied to it, said element being so connected in the birdge and a potential varying about a mean value in dependence upon the rate of change of armature potential being so applied to said element that the balance condition of the bridge is altered due to alteration in the resistance of said element in a direction to reduce said armature potential, whatever the polarity of said armature potential, said mean value being such that the resistance of said element is intermediate its maximum and minimum values when said armature is stationary.

9. A servo-motor means according to claim 2 wherein each arm of said bridge adjacent one output terminal thereof comprises a bridge resistor and a semi-conductor diode, one end of each said bridge resistor being connected to said one output terminal of said bridge and the other end of each said bridge resistor being connected to one terminal of the corresponding diode via a corresponding condenser, said diodes being connected in series in the same sense and their common connection being connected to said intermediate tapping, the common connection between each diode and the corresponding condenser being connected via a corresponding bias feed resistor to the end of the winding of said armature remote from said intermediate tapping or to the slider of a potential divider connected across said winding, said diodes being so poled that the balance condition of said bridge is altered, due to alteration in the resistance of at least one of said diodes, in a direction to reduce said armature potential.

10. A servo-motor means according to claim 9 wherein said bias feed resistors and said end of said winding or said slider are connected via a third condenser.

11. A servo-motor means according to claim 2 wherein one arm of said bridge comprises a bridge resistor and a semi-conductor diode, one end of said bridge resistor and one terminal of said diode being connected to one output terminal of said bridge, the other end of said bridge resistor and the other terminal of said diode being interconnected via a condenser, said output terminal of said bridge being connected to one terminal of said power source and the common connection of said diode and said condenser being connected via a bias feed resistor to said common connection between said first resistor and the adjacent one of said output terminals or to the slider of a potential divider connected between said common connection between said first resistor and the adjacent one of said output terminals and said one terminal of said power source, said diode being so poled that the balance condition of the bridge is altered due to alteration in the resistance of said diode, in a direction to reduce said armature potential.

12. A servo-motor means according to claim 11 wherein said bias feed resistor and said common connections between said first resistor and the adjacent one of said output terminals or said slider are connected via a second condenser, the common connection of said bias feed resistor and said second condenser being connected to a source of constant potential via a decoupling resistor.

13. A servo-motor means according to claim 4 wherein one arm of said bridge comprises a bridge resistor and a semi-conductor diode, one end of said bridge resistor and one terminal of said diode being connected to one output terminal of said bridge, the other end of said bridge resistor and the other end of said diode being interconnected via a condenser, said output terminal of said bridge being connected to one terminal of said power source and the common connection of said diode and said condenser being connected via a bias feed resistor to one terminal of a second condenser connected to a source of constant potential via a decoupling resistor the other terminal of said second condenser being connected to either end of the winding of said armature, said diode being so poled that the balance condition of the bridge is altered, due to alteration in the resistance of said diode, in a direction to reduce the potential across said winding.

14. A servo-motor means according to claim 2, wherein said first resistor is the filament of a metal filament lamp.

15. A servo-motor means according to claim 4, wherein said load resistors are the filaments of metal filament lamps.

16. A servo-motor means according to claim 1, in which the motor includes a rotatable armature and a rotatable disc frictionally driven by the armature.

17. A servo-motor means according to claim 16, wherein said movable member forms one output terminal of said bridge and is constituted by the slider of a second potential divider the two portions of which are respectively connected in the arms of said bridge adjacent said one output terminal, said disc being integral with a shaft having its axis coincident with the axis of said disc, said second potential divider being of arcuate form having its centre of arc coincident with the axis of said shaft and said slider being carried by a radial arm integral with said shaft and operable upon movement of said movable member in response to a change in the variable quantity to adjust the balance condition of the bridge to restore the amplitude of oscillation to the predetermined value.

18. An indicating instrument according to claim 17 wherein a radial pointer integral with said shaft moves over a stationary scale of arcuate form having its centre of arc coincident with the axis of said shaft.

19. A servo-motor means according to claim 16 including an arm mounted upon a pivot and supporting the motor and a spring for biasing the arm to maintain frictional engagement of the shaft of the armature with the periphery of the disc.

20. A servo-motor means according to claim 19, said arm and motor being mechanically balanced about the axis of the pivot.

References Cited in the file of this patent

UNITED STATES PATENTS

| 2,576,611 | Lang et al. | Nov. 27, 1951 |
| 2,787,710 | Van Tol | Apr. 2, 1957 |
| 2,812,481 | Roosdorp | Nov. 5, 1957 |
| 3,005,135 | Palmer et al. | Oct. 17, 1961 |

FOREIGN PATENTS

| 349,496 | Great Britain | May 22, 1931 |